April 12, 1966 J. HIRSCH 3,246,323
TACTILE COMMUNICATION SYSTEM
Original Filed Dec. 6, 1957
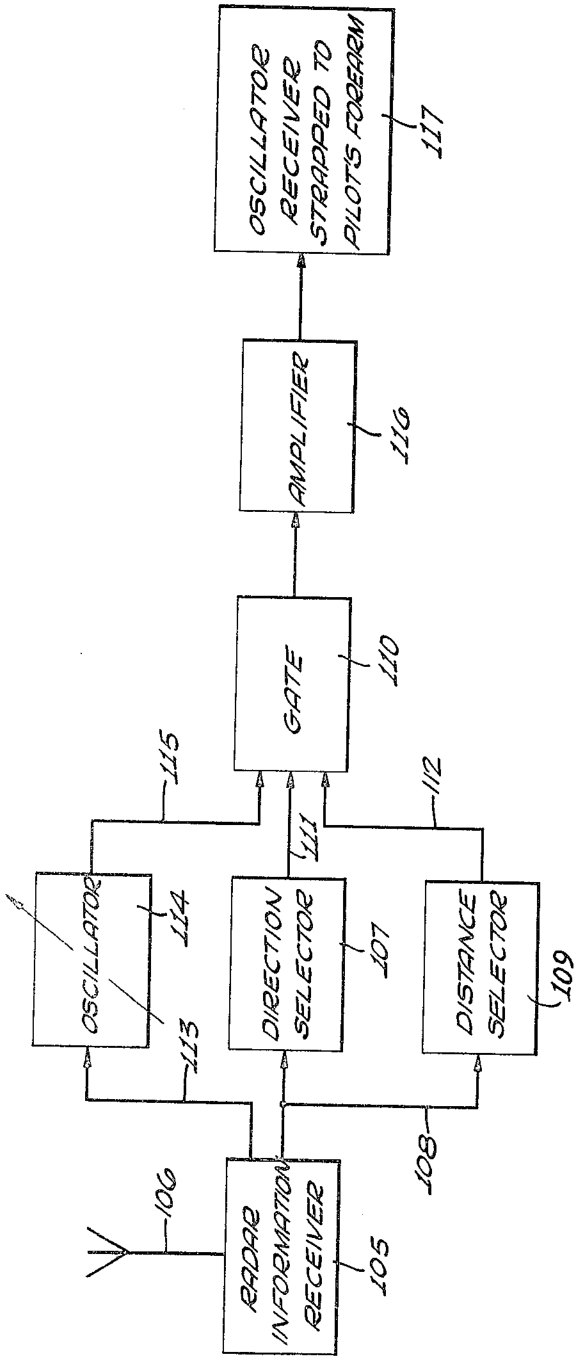
JOSEPH HIRSCH
INVENTOR.
BY Smyth, Roston & Pavitt
ATTORNEYS United States Patent Office 3,246,323
Patented Apr. 12, 1966

3,246,323
TACTILE COMMUNICATION SYSTEM

Joseph Hirsch, 1117 Fiske St., Pacific Palisades, Calif.
Original application Dec. 6, 1957, Ser. No. 701,087, now Patent No. 3,157,853, dated Nov. 17, 1964. Divided and this application June 1, 1964, Ser. No. 379,062
3 Claims. (Cl. 343—7)

This is a division of application Serial No. 701,087 filed December 6, 1957 (now Patent No. 3,157,853), which is a continuation-in-part of application Serial No. 465,315, filed October 28, 1954 (now abandoned).

This invention relates to tactile communication systems and more particularly to means for and a method of operating an aircraft utilizing an improved tactile communication system adapted to communicate complex operational information over both short and long distances. By short distances, reference is had to communication within the craft itself whereas long distances include communication between the craft and some other separate object such as the ground, another craft, or a remote object.

Although the distinct advantages of communicating information directly to the brain through tactile reception have been known and although prior attempts have been made to utilize the principles thereof in communicating information to the pilot and other crewmen of aircraft, the equipment heretofore provided for communicating tactually has been subject to so many shortcomings and so restricted in its range of capabilities as to offer no advantage over other available communication systems. It is known, for example, that vibratory stimuli tactually received is communicated to the brain automatically and without effort on the part of the subject. Unlike visually perceived information, there is no need for first adjusting the optic muscles to the nicety required in adjusting peripheral pressure on the lens system of the eye to focus on a specific target. Not only is an irreducible time period required for such adjustment of the eye, but the muscular and nervous energy consumed in the process is finite and leads to fatigue if continued over a period of time. Tactually perceived information, on the other hand, involves inconsequential effort on the part of the person, the information so perceived being impressed upon the brain automatically and significantly, with little or no interference with the simultaneous registry of other information received both visually and aurally. Accordingly, it will be appreciated that the communication of information tactually provides a complete channel to the brain independent of the ears and the eyes. The vast potentialities of this little used channel have gone unnoticed and are only now becoming evident.

Reference will now be had to specific applications for the tactile communication system of this invention. It is known that pilots of aircraft realize that much reliance in the flying of aircraft has been placed on the communication of certain characteristics of flight conditions to the pilot's brain via the "seat of his pants." This is because changes in flight conditions or in the attitude of the plane are instantly and instinctively sensed by the pilot by relative movement between his body and the plane seat. For example, changes in plane acceleration, the sudden shifting of the plane laterally, pitch, roll and other similar changes are sensed instinctively and automatically without need for visually checking instruments, viewing the horizon or other reference sources.

According to one mode of utilizing the communication system provided by this invention, tactually perceived significant intelligence can be communicated directly to the pilot or other crew member aboard the plane or, in the alternative, it can be communicated tactually to a remote human receiver stationed either on the ground or in another craft, such human receiver being provided with other means for communicating the essential portions only of the intelligence back to the originating craft or to other persons having need therefor. For example, the tactile communicating system may be coupled to numerous sources of information aboard the craft for the purpose of keeping the remote human operator fully apprised of miscellaneous operating conditions abroad the plane with the details of which it is unnecessary for the plane crew to be concerned.

The communication system of this invention will therefore be understood to permit the remote operator to concentrate on a certain phase of the operation to the exclusion of all other operating conditions and to the end that he may communicate to a particular member of the crew such information as is essential to the crew member. Such a communication system makes it possible for a remote operator, such as a ground crewman, to be fully informed of all flight conditions essential for the blind landing of the craft and by voice or other communication directed back to the pilot to inform the pilot on information necessary for the blind landing of the plane.

It will also be understood that according to another mode of operation the communication system provided by the present invention can be connected directly to the pilot or one or more crewmen in a manner channeling desired operational information directly to the brain through tactile perception leaving the crewman free to receive visual or aural information about other flight and operational conditions. In this simplified version of the system it is unnecessary to provide radio transmitters for communicating the information between the ship and a remote point as well as a return communication system to a crewman aboard the ship.

According to still another arrangement and application of the communicating system of this invention, the activating signal for the communicating system may be such as advises the human receiver by tactile preception of approaching danger such as the closing distance between the craft and another craft or between the craft and a feature of the terrain.

It will therefore be appreciated that the principles of this invention are very flexible and may be applied in a variety of ways to apprise a crewman or of someone acting in concert with the crewman of desired information automatically and without effort on his part by the the use of vibratory stimuli and tactile perception.

Also, on take-off a pilot may have need for focusing alternately on a nearby object, such as an instrument panel, and a distant object such as the runway or horizon. If, under these conditions, he is called upon to take some action based on information from such near and distant sightings, his reaction time will be increased by the time required for the accommodation and convergence as he changes focus to view the near and distant objects. This critical time loss can be avoided if the essential information for the action can be supplied tactually to the pilot without need for first making visual sightings of any kind thereby leaving the eyes free for other purposes.

Also, emergency situations arise and it is important that the pilot be made instantly aware of such situations without the delay unavoidability entailed in such operations as the focusing of the eyes. For example, the attitude of the airplane might be approaching stall conditions and such information should instantly be provided the pilot.

According to still another mode of utilizing the tactile communication system of this invention, the activating signals can be picked up by radar equipment or other sensing instrumentation effective in measuring the distance between the aircraft and other aircraft in the vicinity or an obstruction in the path of flight, the received signal being utilized to apprise the receiving crewman by tactile perception of the changing distance and the direction of change between the aircraft and the other object.

Accordingly, it is a primary object of the invention to provide means for instantaneously sensing and communicating to an operator's brain by vibratory stimuli and tactile perception information useful in the operation of aircraft and the like.

Another object of the invention is the provision of instrumentation for aircraft functioning automatically to convey desired operation information to members of the crew by tactile communication means.

Another object of the invention is the provision of instrumentation for aircraft by which the angles of rotational movements and of certain other operational factors can be measured and automatically channelled to a human occupant of the craft via readily understood tactually perceptible stimuli.

Another object of the invention is the provision of a system and means for communicating changing operational flight conditions of an aircraft directly to the brain of a receiving operator through tactile perception.

Another object of the invention is the provision of a communication system for detecting the changing distance and direction of change between the vehicle under way and an object in its course together with means for communicating the information tactually to a crewman aboard the vehicle.

These and other more specific objects will appear upon reading the following specification and claims and upon considering in connection therewith the attached drawings to which they relate.

Referring now to the drawings in which preferred embodiments of the invention are illustrated:

This single figure is a schematic view of still another embodiment useful in communicating information of the changing distance between a moving craft and some other object.

Although the circuit is to be described for communicating information between a craft in flight and a ground operator, it will be understood that the intelligence communicated may be confined to the craft itself. Likewise, the remote receiver may be located on another craft in flight. By means of this greatly simplified system, certain essential information needed by the pilot or by any other crew member may be communicated directly to the brain without need for effort or action on the part of the receiver and without interference with the use of his eyes or ears for the perception of information aurally or visually. Although the system will be disclosed in connection with certain condition sensing devices, it will be apparent that the sensing devices may be designed to provide changing operational information about any condition whatsoever and irrespective of whether the conditions are related or unrelated. And, of course, the number of sensing devices which can be utilized in the manner described is not limited to the number here shown but may be increased or decreased as found desirable within the limits of the available frequencies which can be used to activate the vibratory stimulators in a manner interpretable by tactile perception.

There remains to be described an embodiment of the invention useful in sensing the changing distance between a craft in flight and some other craft or fixed object lying in or close to the flight course. The suitable system operable for this purpose and appropriately termed a collision anticipator is illustrated in the figure wherein it will be seen to comprise a radar information receiver 105 having a suitable searching antenna system 106 connected therewith. It will be understood that the antenna system may include one or several searching devices as required to search the area to either side and forwardly of the plane including both the direction of other objects with respect to the flight course and the distance thereof from the plane. The signals relating to the direction of the object, whether such object be another aircraft or a stationary object such as a mountain, is channeled into direction selector analyzer 107, whereas the distance signal is channeled through lead 108 into the distance selector analyzer 109.

It will be understood that analyzers 107 and 109 include such connections as may be necessary to operate suitable known computer components for analyzing the signals and determining whether a collision is likely if the craft carrying the equipment continues on its course. If analyzer 107 indicates that the craft is flying on a collision course or close thereto and distance analyzer 109 indicates that the distance vector is decreasing at a rate such that a collision is likely, then the signal outputs from 108 and 109 passing to the triple triode gate 110 through channels 111 and 112, respectively, are jointly effective to open this gate to pass a variable signal emanating from variable oscillator 114.

It will be understood that radar receiver 105 includes means for transmitting a signal over channel 113 to operate any suitable servo-mechanism to vary the frequency output of oscillator 114 within the tactually perceptible range of frequencies mentioned above. Preferably, the servo-mechanism and oscillator 114 are so arranged as to increase the frequency of the output signal in accordance with the proximity of the impending collision, whereby a higher frequency indicates an emergency situation. If the outputs of the direction and distance analyzers taken together indicate a collision course, their combined outputs function to hold gate 110 open so that the frequency output of oscillator 114 flows through channel 115, through gate 110 and into an amplifier 116 if one is necessary to provide a signal of sufficient strength to operate an oscillatory receiver 117. The latter is of any suitable construction and may be strapped to some part of the pilot's body such as to his forearm so that the vibrations imparted to the skin will convey a readily understood imperative warning to the pilot concerning the imminent danger.

While the particular tactile communication systems and methods of operating an aircraft using tactually perceived intelligence are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. In a collision anticipator for providing a tactile indication to an operator of a vehicle of an impending collision with a detected object, including, first means at the vehicle for detecting the proximate presence of the detected object relative to the vehicle and for providing a signal related to the distance therebetween, second means at the vehicle and coupled to said detecting means for generating a variable frequency signal having an instantaneous frequency corresponding to the instantaneous distance between the detected object and the vehicle, third means at the vehicle and responsive to the signals from the first and second means for passing the variable frequency signal from the second means in accordance with particular characteristics of the signal from the first means, and a tactile vibrator at the vehicle, said vibrator being operatively coupled to the third means and to the operator and being responsive to said variable frequency signal from said generating means for providing a vibratory tactile sensation to the operator at a frequency related to the distance between the detected object and the vehicle whereby the rate of change of the frequency of the vibration provides an indication of the rate of closure between the object and the vehicle.

2. In a collision anticipator for providing a tactile indication to an operator of a vehicle of an impending collision with a detected object, including, a receiver for receiving signals from the detected object, a direction sensor coupled to the receiver for indicating the direction at which the detected object is moving relative to the vehicle, a distance selector coupled to the receiver for indicating the variations in distance of the detected object relative to the receiver, means operatively coupled to the receiver for providing a variable frequency in accordance with variations in the distance between the detected object and the vehicle, and a tactile vibrator at the receiver, the tactile vibrator being operatively coupled to the direction selector, the distance selector and the last mentioned means for providing a vibratory tactile sensation to the operator at a frequency related to the distance between the detected object and the vehicle and in accordance with collision indications provided by the direction selector and the distance selector whereby the rate of change of the frequency of the vibration provides an indication to the operator of the rate at which the detected object is approaching the vehicle.

3. The collision anticipator set forth in claim 2 wherein gate means are responsive to the direction selector, the distance selector and the variable frequency means to pass the signals from the variable frequency means in accordance with the characteristics of the signals from the direction selector and the distance selector and wherein the tactile vibrator is responsive to the signals passing through the gate means from the variable frequency means.

References Cited by the Examiner

UNITED STATES PATENTS

| | | | |
|---|---|---|---|
| 2,571,368 | 10/1951 | Kahn et al | 343—112.4 |
| 2,574,596 | 11/1951 | Slaymaker. | |
| 3,112,480 | 11/1963 | Lakatos | 343—112.4 |

OTHER REFERENCES

Ballard, J. W. et al.: Tactual Sensory Control System, Electrical Manufacturing, October 1954 (pp. 118–121.)

CHESTER L. JUSTUS, *Primary Examiner.*

T. H. TUBBESING, *Assistant Examiner.*